United States Patent [19]

Silke et al.

[11] Patent Number: 4,577,499

[45] Date of Patent: Mar. 25, 1986

[54] SLOPE-SPEED SENSOR FOR SEAM WELDING APPARATUS

[75] Inventors: Gerald W. Silke, El Cajon; Frank D. Weber, Poway, both of Calif.

[73] Assignee: Cyclomatic Industries, Inc., San Diego, Calif.

[21] Appl. No.: 595,502

[22] Filed: Jun. 18, 1984

Related U.S. Application Data

[62] Division of Ser. No. 442,617, Nov. 18, 1982, abandoned.

[51] Int. Cl.⁴ ............... G01B 5/20; G01B 9/00; G01D 21/02; G01P 4/00
[52] U.S. Cl. .................. 73/432 R; 33/1 PT; 33/530; 228/9
[58] Field of Search .......... 33/1 N, 1 PT, 1 AP, 33/174 C; 73/432 R, 493; 228/9

[56] References Cited

U.S. PATENT DOCUMENTS

| | | | |
|---|---|---|---|
| 1,547,380 | 7/1925 | Godfrey | 33/174 C |
| 1,932,103 | 10/1933 | Godfrey | 33/174 C |
| 2,500,137 | 3/1950 | Poulton | 33/174 C |
| 3,346,724 | 10/1967 | Fuhrmeister | 33/1 MP |
| 3,443,732 | 5/1969 | Wall, Jr. et al. | |
| 3,737,614 | 6/1973 | Paulange | |
| 3,970,232 | 7/1976 | Melton | |
| 4,040,557 | 8/1977 | Heverly | |
| 4,118,620 | 10/1978 | Wall, Jr. et al. | 219/124.32 |
| 4,296,306 | 10/1981 | Nomura | |
| 4,426,565 | 1/1984 | Ruter | 219/130.01 |

FOREIGN PATENT DOCUMENTS

| | | | |
|---|---|---|---|
| 2840351 | 3/1979 | Fed. Rep. of Germany | 228/9 |
| 74091 | 6/1980 | German Democratic Rep. | 228/48 |
| 743821 | 6/1980 | U.S.S.R. | 228/48 |

Primary Examiner—S. Clement Swisher
Attorney, Agent, or Firm—Majestic, Gallagher, Parsons & Siebert

[57] ABSTRACT

A seam welding apparatus is provided which automatically senses and adjusts the position of a welding torch in triaxial X, Y and Z directions and controls the position so as to maintain a predetermined position of the torch with respect to an irregularly shaped workpiece such as elliptical shapes. The apparatus also provides for continuously sensing and adjusting the surface speed of the workpiece so as to maintain a predetermined constant speed. A slope/speed sensor is also provided for sensing surface speed and slope of the workpiece. A method of continuously sensing triaxial position and surface speed of the workpiece adjacent the torch and adjusting the position of the torch and speed of the workpiece so as to maintain a desired position and speed is also provided.

11 Claims, 8 Drawing Figures

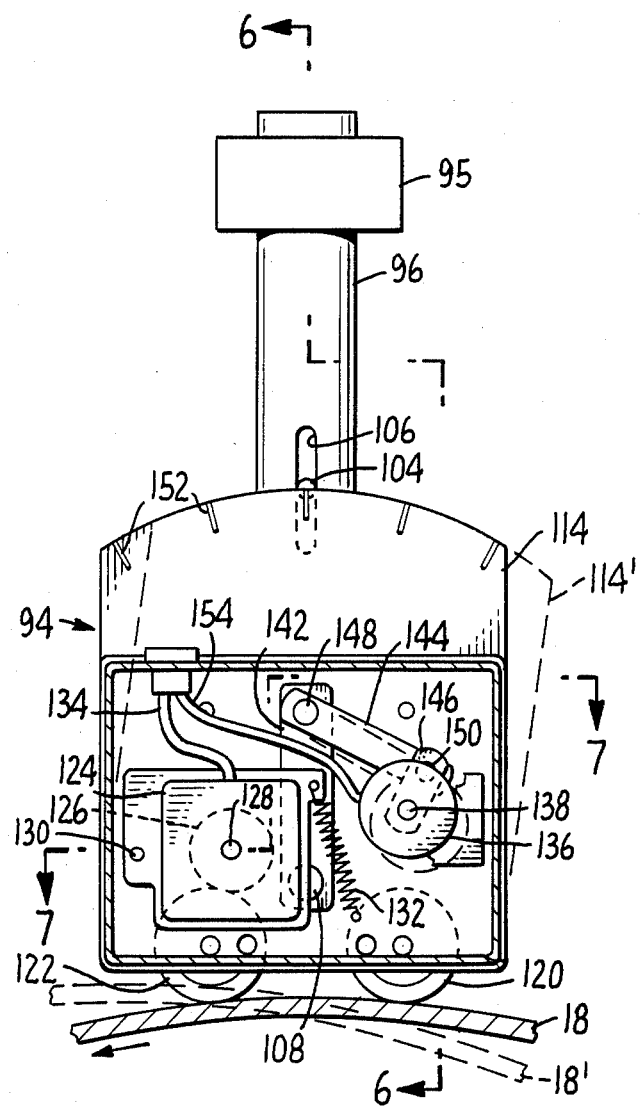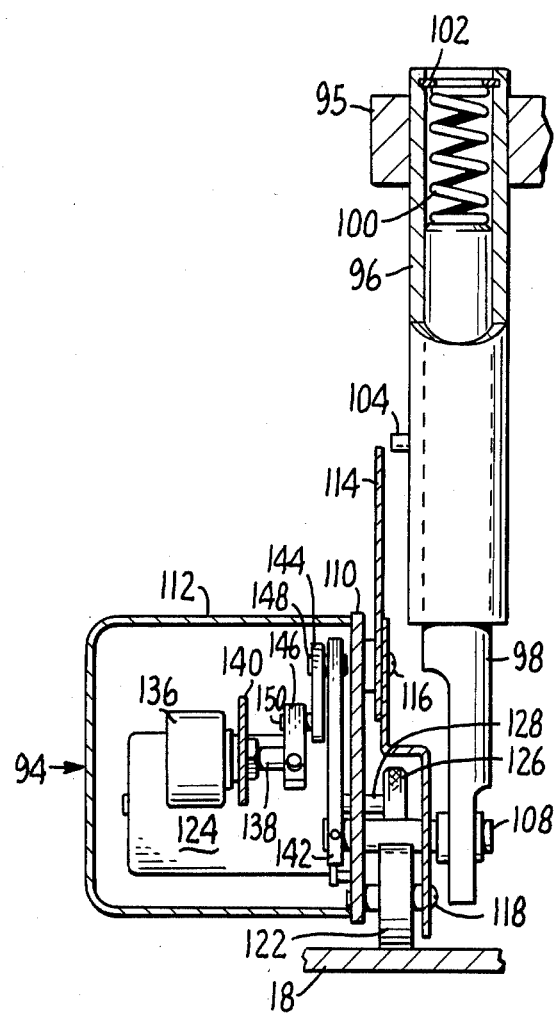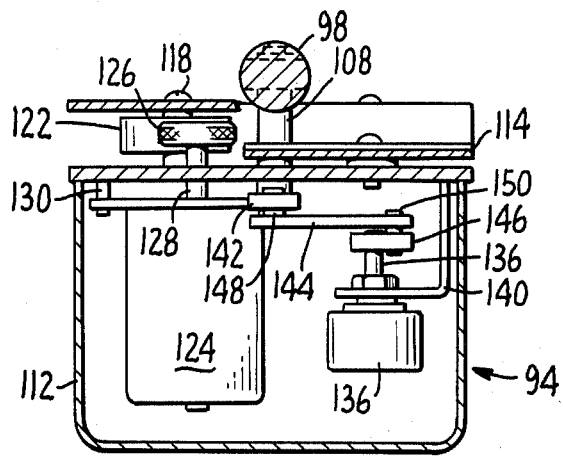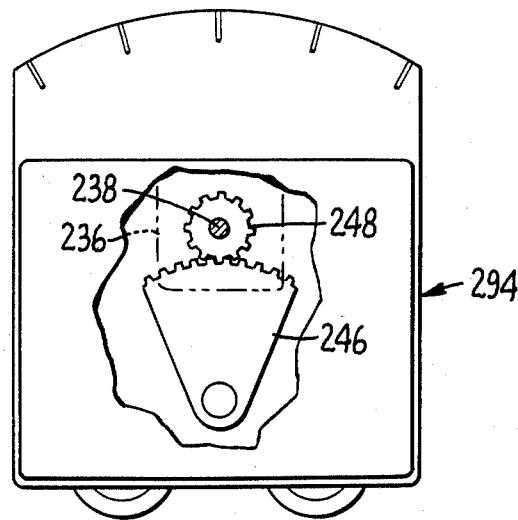
FIG. 5.
FIG. 6.
FIG. 7.
FIG. 8.

SLOPE-SPEED SENSOR FOR SEAM WELDING APPARATUS

This is a division of Ser. No. 442,617, filed Nov. 19, 1982, now abandoned.

FIELD OF THE INVENTION

This invention relates to a seam welding apparatus and method. More particularly it relates to a welding apparatus which can automatically follow a seam by means of triaxial positioning of the welding torch and thereby accommodating irregularly shaped workpieces.

PRIOR ART

The necessity of welding irregularly shaped workpieces such as elliptical tanks or pipes has long been present. Prior to the advent of automatic seam tracking welding devices, these kinds of welding assignments were performed largely by hand.

Performing such welds by hand has several deficiencies. First, it requires a high degree of operator skill to manually follow the weld joint. This level of skill is not always available. Second, even a skilled operator cannot lay down a completely perfect weld bead in a weld seam between two irregular parts to be joined.

Because of these and other deficiencies in performing such welds manually, automatic seam tracking welding equipment has been developed in an attempt to perform the difficult welds thus described.

One such attempt is shown in U.S. Pat. No. 3,737,614. However, this rather elementary device is suitable for circular shapes and uses a pre-programmed cam mechanism for adjusting the various functions rather than "sensing" to control any of the parameters.

Another of such attempts is shown in U.S. Pat. No. 4,040,557. However, this device will not accommodate truly irregular shapes or irregular weld seams as it only has two rather than three axes of movement. Also, its sensors are positioned some distance from the point of welding thus injecting error in positioning. Still further, the device does not sense speed of rotation of the workpiece so that such may be compensated for in the welding operation.

Another device of interest is shown in U.S. Pat. No. 4,296,306. As with the previously discussed patent device the slope of the workpiece to be welded is sensed by a sensor which is removed from the point of welding, thus injecting error. The subject device changes torch angle to accommodate the change in shape read from the sensor and speed is adjusted as a predetermined function of the torch angle. Torch height above the workpiece is controlled by means of an arc voltage control device.

None of these prior art devices are completely satisfactory for welding irregular workpieces such as elliptical shapes, and exhibit critical deficiencies when used in certain welding applications. One such application is where the weld joint is irregular or moves cross-wise to the torch. Another is where the change in radius of the part could affect the welding accuracy. Yet another is where it is desired to monitor and control actual welding speed in a continuous manner.

Accordingly, the present invention is designed to solve these and other deficiencies in the prior art. The seam welding apparatus of the present invention is designed to accommodate irregularly shaped workpieces such as those having elliptical or out of round cross-section. It is also able to accommodate weld joints that are irregular.

SUMMARY OF THE INVENTION

The present invention provides for X,Y,Z or triaxial degrees of movement or positioning of a welding torch. A welding torch or weld head is suitably mounted on an adapter plate which is, in turn, mounted on the face plate of a cross-slide of a support framework. X,Y and Z cross slides are movably interconnected into a cross-slide assembly so as to provide triaxial motion or positioning of the welding torch or weld head.

The irregularly shaped member or workpiece to be welded is rotatably mounted for movement past the torch by means of a motor driven rotary positioner. A probe is provided and is mounted to the cross-slide assembly by means of appropriate brackets. The tip of the probe contacts the weld joint and senses two degrees of movement or position, being the X-Y degrees. This motion is electronically transmitted to suitable X and Y sensors and thence to X and Y controllers. The controllers, in turn, position X and Y cross-slides, respectively.

In addition, a slope/speed sensor is provided which contacts the surface of the rotating workpiece adjacent the point of welding. The slope/speed sensor comprises a housing having a pair of spaced-apart drive wheels extending below bottom portion thereof. The slope/speed sensor is mounted to the faceplate and thereby to the cross-slide assembly. It is spring loaded so that the drive wheels are always in contact with and bear on the workpiece.

One of the drive wheels transmits rotary motion of the workpiece to a trachometer. The tachometer is, in turn, electrically connected to a controller which controls the rotary speed of the rotary positioner and thereby the rotary speed of the workpiece past the torch tip.

The other of the drive wheels functions, in concert with the first drive wheel, to angularly position the slope/speed sensor housing with respect to the workpiece surface. The angular position from a neutral datum is transmitted to a potentiometer within the housing by position transmission means such as a linkage or a gear arrangement. The potentiometer is electrically connected to a Z controller which controls a Z servo and thereby a Z cross-slide. In this manner triaxial positioning is provided to the welding torch and at the same time the surface speed of the workpiece is controlled to be a predetermined value.

In addition to accurate positioning of the torch, the invention also provides that the point of welding may be at a point on the workpiece other than the top dead center point. It is useful, for example, to have the point of welding slightly removed from top dead center so that the molten weld material will have time to cool and partially solidify before it goes over the top dead center point as the workpiece is rotating.

DESCRIPTION OF THE DRAWINGS

FIG. 5 is a front elevation view of a slope/speed sensor of the instant welding apparatus with its cover removed to enable viewing of the interior structure thereof;

FIG. 6 is a side elevation view of the slope/speed sensor of FIG. 5 partially in section along lines 6—6;

FIG. 7 is a top view of the same partially in section along lines 7—7 in FIG. 5; and, FIG. 8 is a partially cut-away alternate embodiment of the slope/speed sensor of FIGS. 5-7 partially cut-away to show details thereof.

DETAILED DESCRIPTION OF THE PREFERRED EMBODIMENTS

Figure 1:
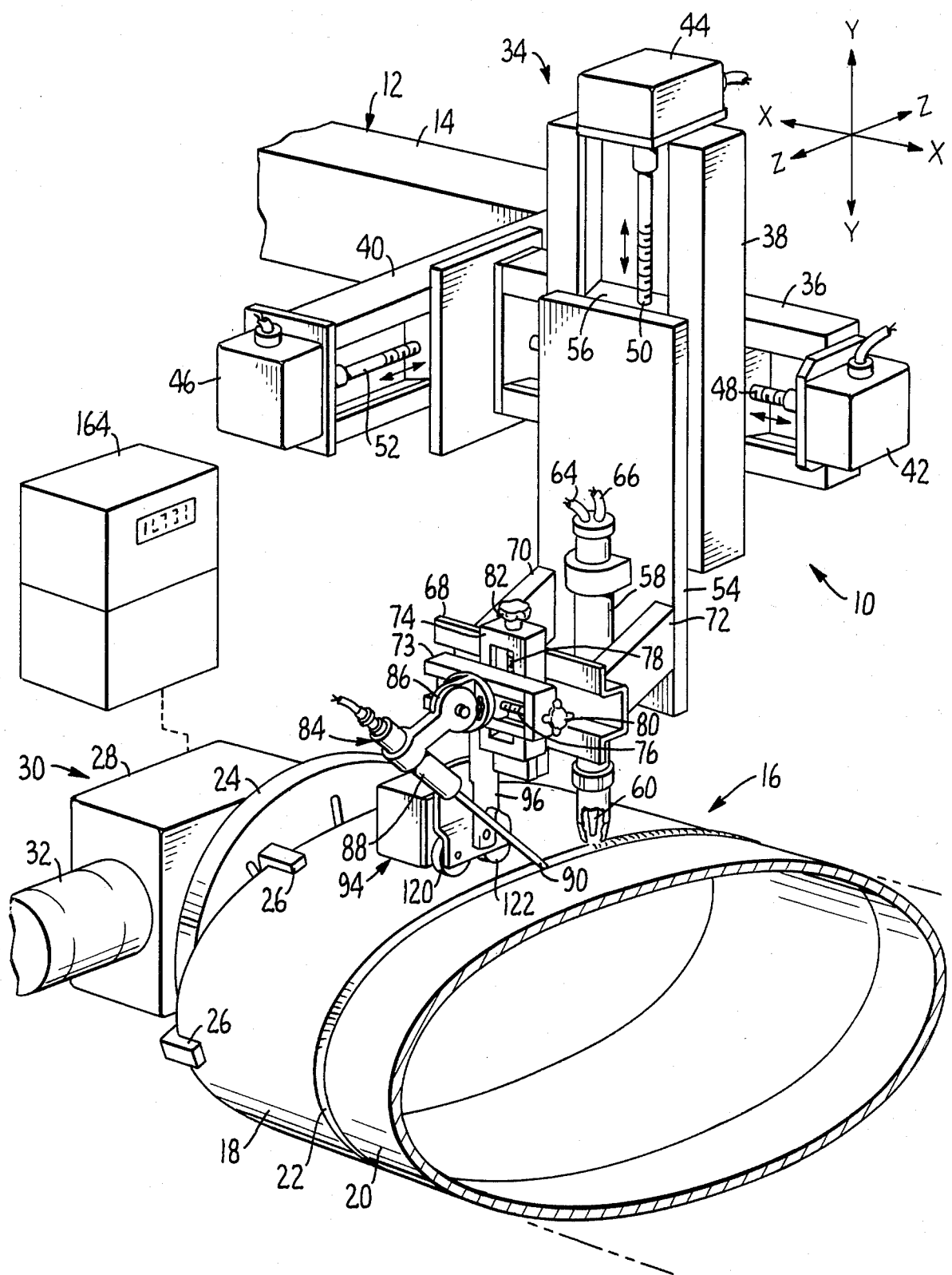
FIG. 1 is a top quarter isometric view of the invention showing the welding of two hollow members of elliptical cross-section.

Referring to FIG. 1 there is shown generally at 10 a seam welding apparatus of the present invention. The apparatus includes a framework assembly 12, partially cut away. It is to be understood that the framework assembly may extend to the floor mounting surface by means of a vertical column and horizontal base (not shown). The framework assembly includes a horizontal arm 14 which is positioned over the workpiece shown generally at 16.

The workpiece may be in the form of two elliptical halves 18,20 as shown which are in abutting relationship for welding. A weld joint or groove 22 is circumferentially formed around the abutting workpiece halves, which groove is formed by previously beveling the ends of the workpiece halves. It may be understood that the workpiece halves may be temporarily tack welded in the position shown to maintain their position during the seam welding operation. Alternatively, some form of tailstock may be used.

The workpiece is mounted for rotation on a circular mounting plate 24 by means of adjustable dogs 26. The mounting plate is centrally mounted for rotation on a drive shaft (not shown) which is journalled into rotary positioner housing 28, of rotary positioner 30. A rotary positioner motor 32 is connected by suitable gearing (not shown) within the housing to impart rotary motion to the mounting plate. It is to be understood that the rotary positioner may itself be mounted on the base plate (not shown).

A triaxial cross-slide assembly 34 is mounted on horizontal arm 14 so as to be positioned over the workpiece. The cross-slide assembly consists of three mutually perpendicular cross-slides 36,38, and 40 corresponding to the X,Y, and Z axes, respectively. Each of the three cross-slides is separately driven by motors 42,44 and 46 through drive screws 48,50,52 on roller-type slides so that their respective positions may be electrically controlled as will be described hereinafter.

A face plate 54 is mounted on the Y cross-slide carriage 56 which, in turn, mounts a welding torch 58 having a tip 60 by means of a "u" shaped torch mounting bracket 62. Gas and/or wire feed lines 64,66 extend from the proximal end of the torch in the conventional manner. Alternately, a weld head (not shown) may be mounted on the faceplate.

Figure 2:
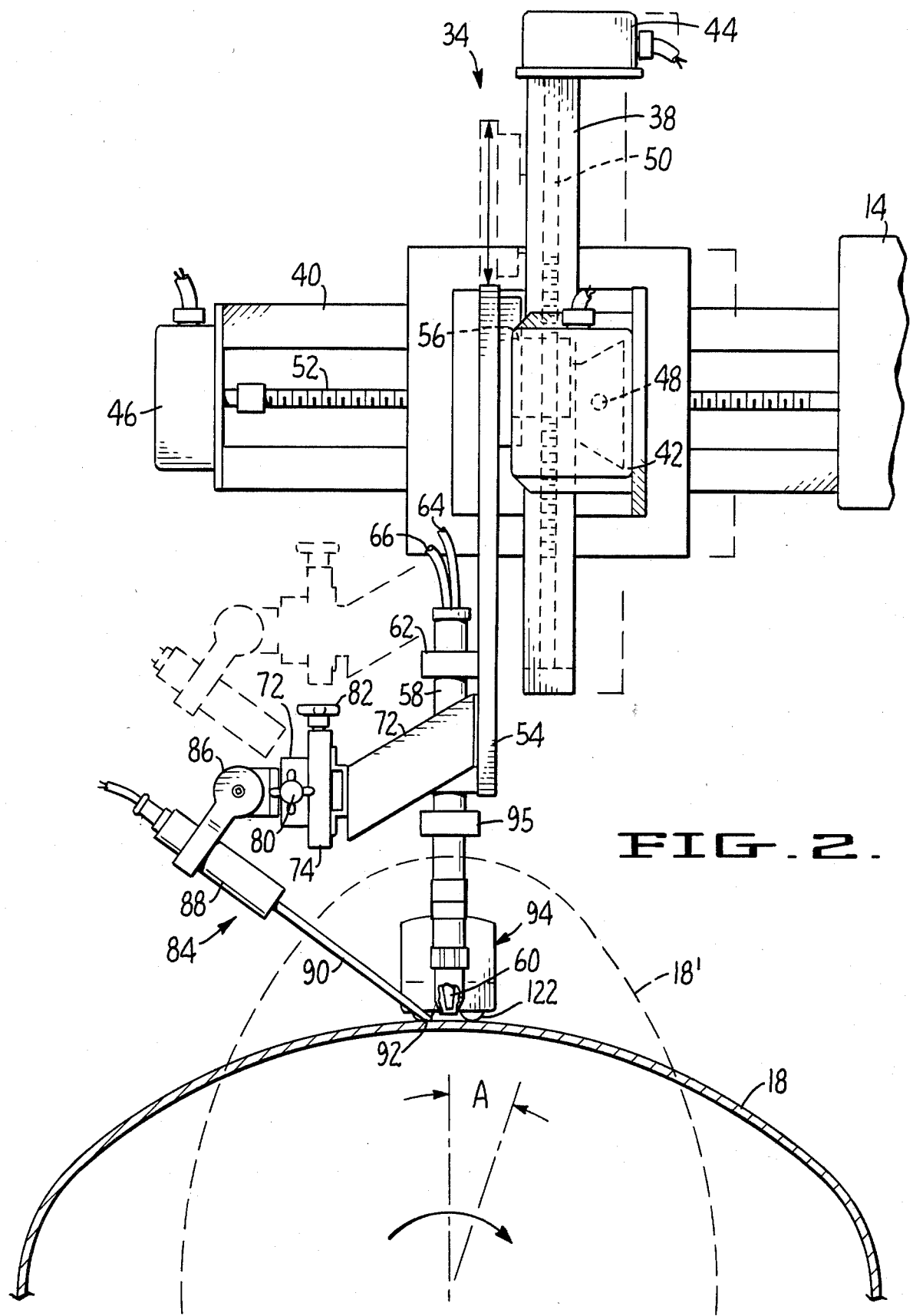
FIG. 2 is an enlarged side elevation view of the seam welding apparatus of FIG. 1 showing details thereof.

As seen in FIGS. 1 and 2, a transverse mounting bracket 68 is operatively spaced apart parallel mounting arms 70,72. A manually adjustable cross-slide assembly includes a pair of manually adjustable vertical and horizontal cross-slides 73,74 mounted thereon. The manual cross-slides contain drive screws 76,78 which are turned by knobs 80,82.

As best seen in FIG. 2, a sensor 84 is articulately mounted to horizontal cross-slide 72 by an adjustable sensor mounting bracket 86. The sensor 84 may be such as is available under the mark Omni-Guide from Cyclomatic Industries, Inc. Such a sensor comprises a sensor body portion 88 which may be gripped by the sensor mounting bracket 86 and a distal end including a probe 90 having an end or finger 92 for tracking in the weld joint.

As may be seen the finger 92 of the probe is positioned very close to the end of the torch tip or may be mounted adjacent to the torch tip, thus substantially eliminating positioning error in the X-Y directions. Sensor 84 gives an X-Y electrical output which is proportional to movement of the probe finger.

Figures 3, 4:
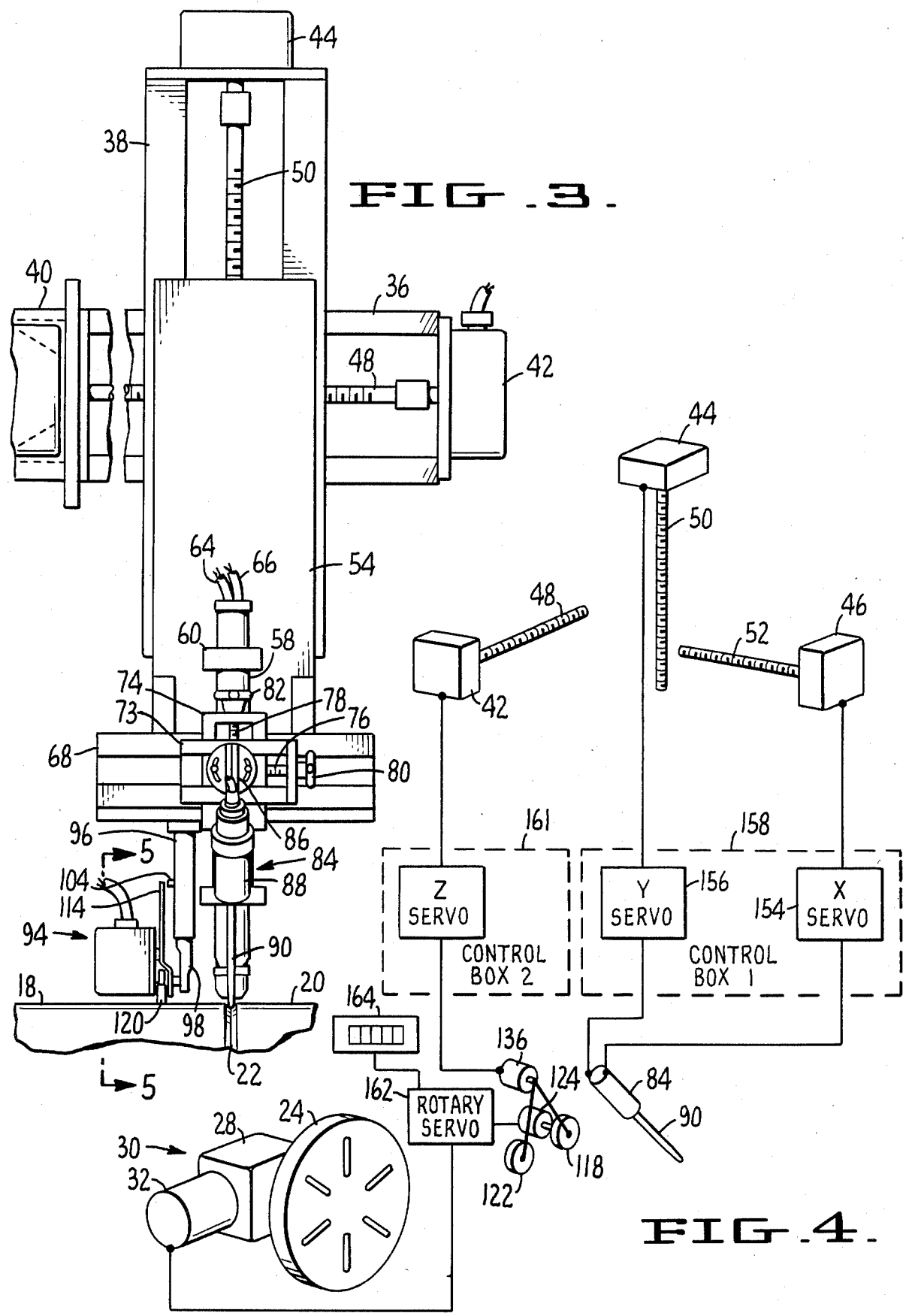
FIG. 3 is an enlarged front elevation view of the same with structure cut away for purposes of clarity and simplicity.
FIG. 4 is a schematic block diagram of the various circuit elements of the seam welding apparatus showing their interconnection and interrelationship with some of the physical elements.

As best seen in FIG. 3, a slope/speed sensor 94 is mounted to the torch 58 by means of a bracket 95. Mounting is by means of a vertically positioned hollow mounting post 96 having a spring loaded rod 98 extending from the open end thereof.

Turning to FIGS. 5-7, the slope/speed sensor is shown in greater detail. As may be seen a coil spring 100 is contained within the hollow mounting post by a ring shaped retainer 102 and abuts an end of rod 98. Movement of rod 98 is between the limits defined by a projecting pin 104 which is movable within elongated vertical slot 106.

As best seen in FIG. 6, a pivot rod 108 is pivotally mounted in a perpendicular manner to rod 98. The slope/speed sensor 94 is comprised of a base plate 110 to which a housing cover 112 is removably mounted. A back plate 114 is mounted to the base plate by screws 116,118. Screws 118 also serve to pivotally mount a pair of drive wheels 120,122 which may be of a resilient material such as urethane plastic, metal or other suitable material.

Drive wheel 122 drives a tachometer 124 through a knurled drive wheel 126 mounted on a tachometer shaft 128. The tachometer is pivotally mounted by means of a pivot 130 at one side thereof. A spring 132 interconnected between the other side of the tachometer and base plate 110 provides tension to maintain the knurled drive wheel in contact with drive wheel 122. In this manner surface speed of workpiece 18 is sensed and an electronic signal proportional thereto is transmitted through a wire 134 to control the Z axis motion as will be hereinafter described.

The other wheel 120 is equally spaced on the opposite side of pivot 108 so that slope of the workpiece is indicated by the tilting of the slope/speed sensor 94 about the pivot. The tilting of the slope/speed sensor may be seen as 114′ to correspond with a changed slope of workpiece 18′ as seen in FIG. 5. A potentiometer 136 having a centrally dispersed shaft is mounted to base plate 110 by means of a mounting bracket 140. Tilting of the slope/speed sensor housing is transmitted to the potentiometer shaft by, for example, set of links 142,144,146 movably interconnected by pivots 148,150. An electrical signal is conducted through wire 154 to the Z controller as will be hereinafter described.

As an alternate embodiment, motion of the slope/speed sensor housing may be transmitted by means of a gear segment 246 which meshes with a pinion 248 mounted on pinion shaft 238 of potentiometer 236 as seen in FIG. 8. It should be understood that other equivalent means of transmitting angular motion of the slope/speed sensor are contemplated including but not limited to belt and pulley means.

Visual indication of the angle or slope is obtained by means of a plurality of spaced indicia 152 which may be aligned with pin 104. In this manner, the welding apparatus may be initially set up at the top dead center or null point on the workpiece.

Alternatively, in making circumferential welds, it is often common practice to want to weld at some predetermined angle from the top dead center of the workpiece. The welding torch may be positioned at some angular relationship to that, perhaps 5 degrees before top dead center, or some other angle A as seen in FIG. 2. The reason for this is that there are certain benefits to be derived in the solidification process by using gravity effects that can be obtained at different positions on the part. One benefit might be to allow the weld to solidify, as the workpiece is rotating, to allow the weld to solidify before it gets into a position where gravity could cause it to rundown the part or run out of the weld seam. Also, another consideration is the addition of powdered flux in the sumberged arc welding process where the flux, of course, is affected by gravity and could fall off the workpiece if it were not distributed at the proper point on the workpiece. With the instant invention, the slope/speed sensor can be electrically adjusted so that the position on the part, the angular relationship to the top dead center point can be adjusted electronically. This means that if it is desired to weld at a position other than the top dead center, an adjustment may be made and it will offset the null in the slope/speed sensor, which would then move the slope/speed sensor around to some angle, for example, 5 degrees before top dead center. This angular relationship would then be constantly tracked throughout the weld and the torch itself can then be adjusted at any angular relationship by means of a bracket or fixture (not shown) to keep it at the optimum relationship to the workpiece.

Turning to FIG. 4, a schematic view shows the sensor 84 electrically linked to X and Y servos 154,156 contained within a control box 158. Similarly, the potentiometer 136 is electrically connected to Z servo 160 within control box 161.

Similarly, a rotary servo 162 is provided to control the speed of rotary positioner 30. A digital readout or display 164 enables visual monitoring of workpiece surface speed.

The various servos, X,Y and Z in turn control the X,Y and Z zero motors 42,44 and 46. In this manner triaxial control of the welding torch is provided.

In operation, the workpiece 16 is chucked onto the mounting plate 24. The torch tip is positioned a desired distance over and in line with the joint 22 at the top dead center or position angularly removed therefrom.

The X-Y sensor finger 92 is placed in the joint and the X and Y servos are set to a null position. The sensor may be positioned by means or manual cross-slides 72,74. Similarly, the slope/speed sensor 94 is positioned on the workpiece and the Z servo adjusted to a null position. A desired surface speed is pre-set into the rotary servo.

The workpiece 16 is then rotated and the surface speed thereof maintained at a predetermined constant rate by constantly sensing the surface speed adjacent the torch tip and adjusting the speed to maintain the predetermined speed.

At the same time, the torch tip is maintained in the proper triaxial position as follows. First, X and Y axis positions are continuously sensed and the X and Y and the torch tip is positioned so as to maintain a predetermined X,Y position. At the same time, the slope or angle of the workpiece at the surface adjacent the torch tip is continually sensed and the Z position thereof is adjusted so as to maintain a predetermined Z position.

It is to be understood that the foregoing description and accompanying drawings have shown and described preferred embodiments of the present invention, but that it should be apparent to those having skill in the art that various changes may be made in the form of the invention without affecting the scope of the appended claims.

We claim:

1. A slope/speed sensor for sensing slope and speed of an object comprising:
   a base,
   a mounting member,
   pivot means pivotally attaching said base to said mounting member, and
   slope sensing means on said base for contacting a workpiece and causing said base to be pivoted relative to said mounting member in proportion to the slope of the workpiece, and
   tachometer means for sensing and transforming surface speed of a workpiece into an electrical characteristic proportional to the surface speed.

2. The invention of claim 1 wherein said slope sensing means comprises means for transforming mechanical motion of said base with relation to said mounting member into an electrical characteristic proportional to the slope.

3. The invention of claim 2 wherein said means for transforming mechanical motion comprises a potentiometer.

4. The invention of claim 3 wherein said means for transforming mechanical motion further comprises linkage means interconnecting said potentiometer with said mounting member.

5. The invention of claim 3 wherein said means for transforming mechanical motion further comprises gear means interconnecting said potentiometer with said mounting member.

6. The invention of claim 1 further including indicia means whereby the workpiece slope may be visually read.

7. The invention of claim 6 wherein said indicia means comprise indicia on said base registrable with indicia on said mounting member.

8. The invention of claim 1 wherein said mounting member comprises a generally elongated rod slidably positioned within a hollow, generally cylindrical mounting post, spring means therein biasing said rod away from said mounting post and stop means on said rod cooperable with said mounting post for limiting travel thereof.

9. The invention of claim 1 wherein said slope sensing means comprises a wheel mounted for rotation on said base and positioned to extend beyond said base so as to be capable of contacting a workpiece.

10. The invention of claim 1 wherein said slope sensing means comprises at least one wheel mounted for rotation on said base and positioned to extend beyond said base so as to be capable of contacting a workpiece.

11. The invention of claim 10 wherein said slope sensing means comprises a pair of wheels juxtaposed on either side of said pivot means.

* * * * *